United States Patent [19]
Grannis

[11] 3,711,049
[45] Jan. 16, 1973

[54] MECHANICAL LOAD LIMITER FOR POWER LINES

[75] Inventor: Roland K. Grannis, San Mateo, Calif.

[73] Assignee: Pacific Utilities Supply Co., San Francisco, Calif.

[22] Filed: Dec. 9, 1971

[21] Appl. No.: 206,322

[52] U.S. Cl. .................................... 248/64, 174/40 R
[51] Int. Cl. ............................................... H02g 7/18
[58] Field of Search ..174/40 R, 40 TD, 45 R, 45 TD, 174/150; 248/58, 63, 64

[56] References Cited

UNITED STATES PATENTS

| | | | |
|---|---|---|---|
| 2,931,606 | 4/1960 | Fraser et al. | 174/40 R X |
| 3,005,866 | 10/1961 | Fraser et al. | 174/45 R |
| 3,117,181 | 1/1964 | Wilson | 174/40 R X |
| 3,150,229 | 9/1964 | Milow | 174/45 R |
| 3,519,727 | 7/1970 | Rasmussen et al. | 174/45 R |

FOREIGN PATENTS OR APPLICATIONS

| | | | |
|---|---|---|---|
| 492,259 | 2/1930 | Germany | 248/64 |
| 405,732 | 9/1943 | Italy | 248/64 |
| 194,013 | 1/1948 | Switzerland | 248/64 |

*Primary Examiner*—Laramie E. Askin
*Attorney*—Julian Caplan et al.

[57] ABSTRACT

A limiter is fixed at one end to a power line tower, or pole arm, and at the other to an insulator attached to a power line. Movement of the line beyond a predetermined limit in either direction causes the limiter to release the insulator, dropping the line and preventing damage to the tower. In one modification, angular movement of the insulator upsets a toggle held in position by a latch in such manner that a cam surface attached to the insulator lifts the latch as the insulator pivots beyond a predetermined angle. The cam shape determines the angle which causes unlatching. In another modification, the horizontal component of the force on the tower is resisted by a spring-loaded lever system; and when the force exceeds a predetermined amount, the spring releases the lever system and the insulator is released.

10 Claims, 9 Drawing Figures

INVENTOR.
ROLAND K. GRANNIS
BY
ATTORNEY

INVENTOR.
ROLAND K. GRANNIS
BY
ATTORNEY

MECHANICAL LOAD LIMITER FOR POWER LINES

This invention relates to a mechanical load limiter for power lines. The utility industry is finding it more difficult to meet the increased demand for electric power and at the same time to obtain right-of-way on which to build new transmission lines. Hence electric utility companies are compelled to seek methods of transmitting more energy over existing rights-of-way. One means of accomplishing this objective is by reconductoring with larger conductors, but this imposes larger mechanical loads upon the towers than their original design accommodates. If, as a result, the tower should fail, the failure would damage or destroy a number of towers which, in turn, would cause long delays in getting the line back in service. In order to avoid replacing towers to handle the larger loads imposed, various load limiters have been used to limit the horizontal component of force to which the tower is subjected and which allow the line to drop to the ground when the pre-selected force is exceeded, thereby avoiding damage to the tower. This is, of course, not feasible with all of the towers but in unpopulated districts replacement of many towers can be avoided by the use of such load limiters.

Therefore, various types of mechanical load limiters have been used but most of these require rotation of a conductor clamp to drop the line. Since the string of insulators interposed between the conductor and the clamp is not rigid, the prior art limiters have not functioned satisfactorily in that they sometimes release before the safe load is exceeded and sometime the limiter does not release until damage to the tower has occurred.

The present invention has for one of its principal objects the provision of a load limiter installed between a tower or pole arm and the string of insulators to which the line is attached which functions to drop the line under certain conditions which exceed the safe load which can be imposed upon the tower or pole. It is, further, a principal purpose of the present invention to provide a limiter which releases positively when the pre-selected condition occurs.

In one form of the invention hereinafter described, the angle which the suspension insulators assume relative to the vertical determines when the limiter releases. A linkage is provided which is normally in toggle and sustains the vertical load required. A horizontal pull tends to upset the toggle but a latch is provided which holds the linkage in position until a cam surface releases the latch. The shape of the cam surface and the latch engagement is variable so as to provide a means for varying the trip angle to suit the individual line requirements.

In another form of the invention useful for large conductors or large span the angle between the vertical and the insulator string is so slight that an angular release is not satisfactory. In this form of the invention a spring loaded leverage system is employed which yields when the horizontal force imposed upon the tower is excessive.

One of the features of the angular release version of the invention is the fact that the formation of ice on the load limiter does not prevent positive performance.

Another feature of the invention is the fact that the devices permit normal movement of the insulator string in both directions, and will restore themselves to the original position upon cessation of such normal movement.

A still further feature of the invention is the fact that the device releases if there is greater than normal force in either direction.

Other objects of the present invention will become apparent upon reading the following specification and referring to the accompanying drawings in which similar characters of reference represent corresponding parts in each of the several views.

Figure 2:
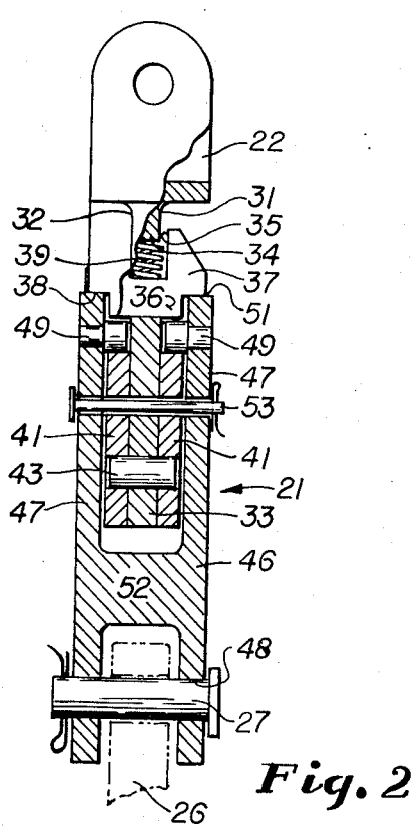
FIG. 2 is an end elevation thereof partly broken away in section to reveal internal construction.
Figure 1:
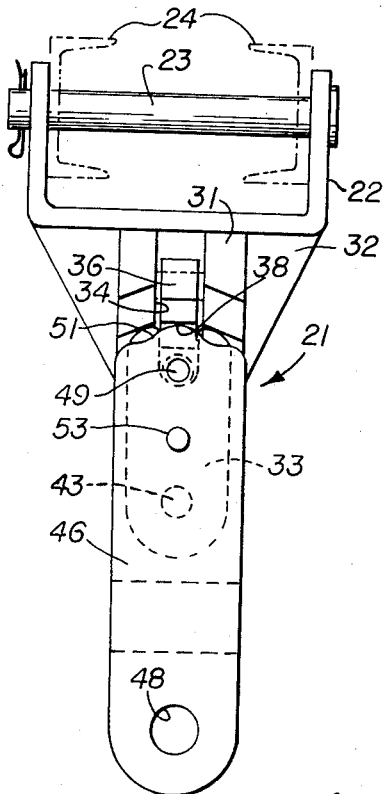
FIG. 1 is a side elevation of one form of the device.
Figure 3:
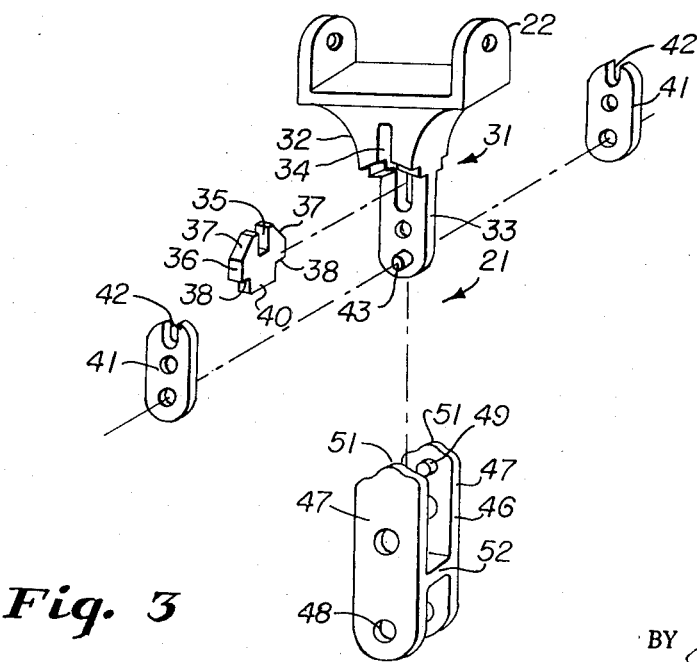
FIG. 3 is an exploded perspective view of the structure of FIG. 1.

Directing attention first to the modification of the invention shown in FIGS. 1–6 inclusive, an angular trip device 21 is shown. This device trips when the angle which the insulator string assumes to the vertical exceeds a predetermined amplitude. More specifically, referring to FIG. 1, the top member 22 of the device is stationarily mounted to the tower arm 24 while the bottom member 46 of the device is connected to an insulator string 26. Horizontal forces on the lower end of the insulator string in a direction parallel to the plane of FIG. 1 cause an angular movement of the bottom member 46 relative to the stationary top member 22 depending upon the direction in which the strain is imposed. When the angle which the bottom member assumes relative to the top member exceeds a predetermined amplitude (see FIG. 4) then the insulator string 26 is dropped.

Figure 4:
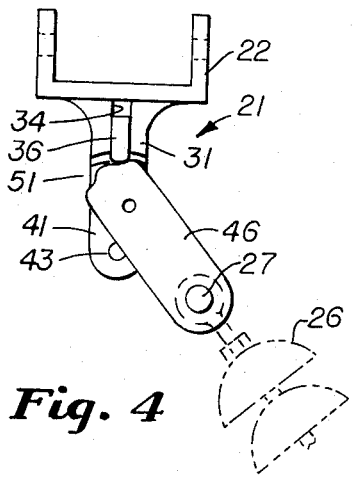
FIGS. 4–6 are schematic side elevational views showing the device in a sequence of positions during the release of the insulator string.
Figure 5:
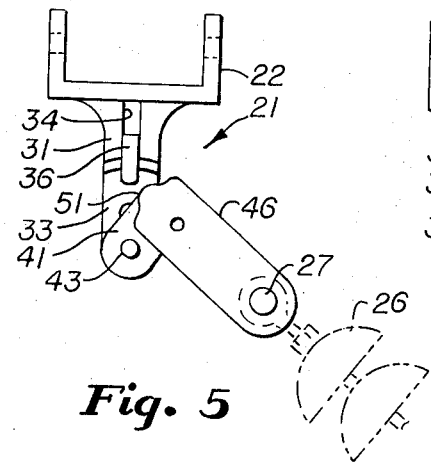
Figure 6:
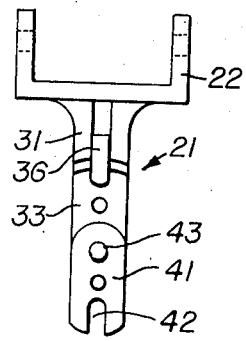

In more specific detail, the device 21 has a top clevis portion 22 which is connected by means of pin 23, or other convenient means, to the arm 24 of a tower or pole. The purpose of the device is to prevent damage to the tower or pole when the strain of the conductor pull exceeds the strength of the tower. Thus, an insulator string 26, the upper end of which is shown in FIG. 2 and a portion of which is shown in FIGS. 4 and 5, is connected at its upper end by pin 27 to the device 21. The lower end of the string is connected by means forming no part of this invention to the conductor.

Top member 31 contains the clevis 22 at its upper end, which clevis is preferably strengthened by means of gussets 32 and has a depending tongue 33 on its bottom and is formed with a vertical slot 34 which extends up into the gusseted portion 32 and down into the tongue 33.

Disposed to reciprocate vertically within the slot 34 is a latch 36 having laterally projecting ears 37 each formed on its undersurface with a cam engaging surface 38. Spring 39 is disposed within the top member 31 and bears against latch 36 which is formed with a slot 35 on its top edge to receive this spring.

On either side of tongue 33 is a link 41 formed at its top with a notch 42 which is aligned with the lower end of slot 34 and is pinned to the lower end of tongue 33 by means of pin 43. In the latched position of the device, the lower extension 40 of latch 36 fits into the notches 42 of both links 41. When, as hereinafter explained, the latch 36 is lifted against the force of the spring 39, extension 40 is lifted out of notches 42, permitting the links 41 to pivot about pin 43 and fall away.

Bottom member 46 has front and back 47 connected adjacent the lower ends thereof by a transverse horizontal web 52. The spacing between front and back 47 is sufficient to accommodate tongue 33 with links 41 on opposite sides thereof plus suitable clearances. Holes 48 are formed in the bottoms of the front and back 47 to receive the upper ends of insulator strings 26 therebetween and to accommodate pin 27. Adjacent the upper ends of front and back 47 are inwardly directed studs 49 which fit into the bottoms of notches 42 in links 41, it being understood that the latch 36 fits into the same notches 42 above the studs 49. The upper edge of each of the front and back 47 comprises a cam surface 51 against which the cam engaging surfaces 38 of latch 36 fit.

To hold the device in assembled position, a lock pin 53 fits through aligned holes in front and back 47, links 41 and tongue 33, as best shown in FIG. 2. However, in order to make the device operative, the pin 53 is removed after the device is installed. Failure to remove the pin 53 makes the device wholly inoperative.

In normal use of the device, the clevis 22 is permanently attached to the arms 24 and the insulator string 26 to the pin 27. Movement of the lower end of bottom member 46 as viewed in FIG. 1 to the right or the left through a small angle does not result in release of the device. In other words, the cam surfaces of member 46 move relative to surfaces 38 pivoting about studs 49. The surfaces 51, at their mid points, have a center of curvature which is coextensive with the axis of studs 49. This accommodates normal variations in position of the conductor which the arms 24 are able to accommodate. Directing attention now to FIG. 4, when the bottom member 46 has shifted in its angular position with respect to the vertical by reason of a pull on the lower end of the insulator string 26 so that the cam surface 51 tends to raise ears 37, the latch 36 is raised out of the notches 42. The angle at which unlatching occurs is a function of the shapes of cam 51 and surface 38. When this occurs, studs 49 pull links 41 to one side or the other, causing them to pivot about pin 43 to the position shown in FIG. 5. In this position, the links 41 are no longer retained by latch 36. The links 41 then pivot in clockwise direction as viewed in FIG. 5 until the studs 49 drop completely out of the notches 42. The bottom member 46 along with the insulator string 26 and the conductor (not shown) carried thereby drops away from the tower, thereby preventing damage to the tower.

Figure 7:
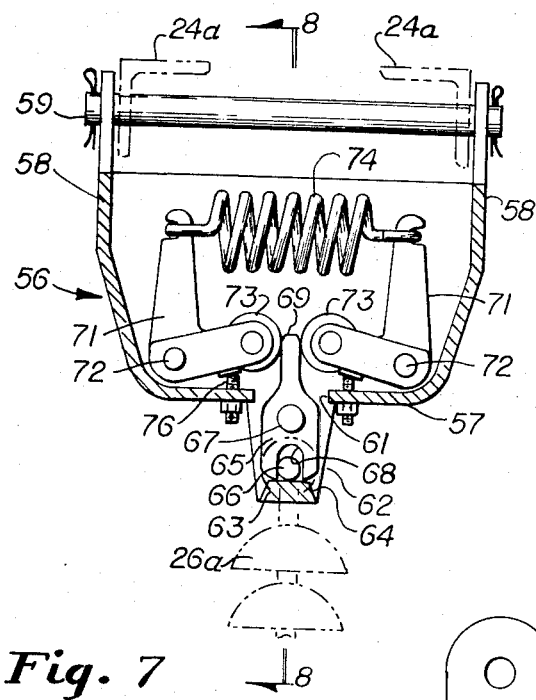
FIG. 7 is a side elevational view of a modification of the construction, with certain portions removed, showing the device in normal condition.
Figure 9:
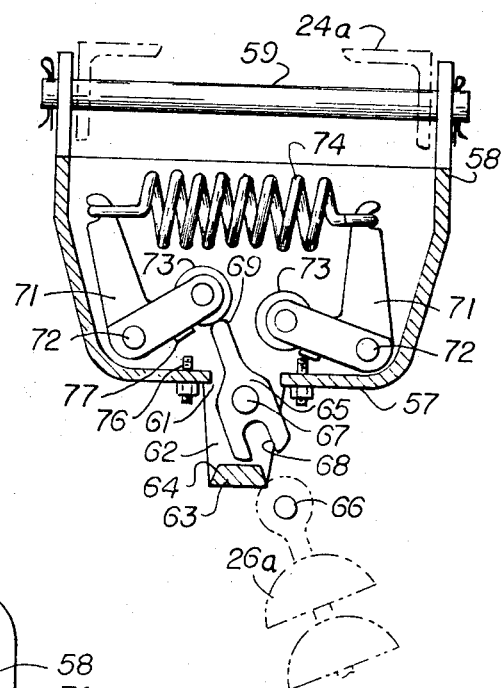
FIG. 9 is a view similar to FIG. 7 showing the device in position for release of the insulator string.
Figure 8:
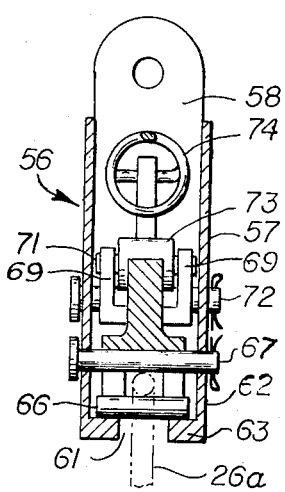
FIG. 8 is a sectional view thereof taken along line 8—8 of FIG. 7.

Directing attention now to the form of the invention shown in FIGS. 7-9, a force limiting device 56 is shown. Said device has a casing 57 having sides 58 which are substantially vertical at their upper ends but which curve downwardly-inwardly at their bottom ends. A top and front and back (not shown) preferably close off the interior of casing 57. The upper ends of sides 58 are connected to tower arms 24a by pin 59. The bottom of casing 57 is formed with a bottom opening 61 and to the front and rear of the opening 61 are depending extensions 62. The lower ends of extensions 62 are formed with inwardly extending lugs 63 having slanted flanks 64 on the left and right sides thereof as viewed in FIGS. 7 and 9.

Fitting into the opening 61 is a restraining link 65 which is pivoted to extension 62 by means of pin 67 and which has a pair of downward facing notches 68 in its lower end. Pin 66 located above lugs 63 fits in the notch 68 and is connected to the upper end of insulator string 26a. Normally pin 66 rests on the top of lugs 63 and is vertically supported thereby. The upper end of restraining link 65 has an ear 69 which projects up into the casing 57.

Within casing 57 is a pair of rocker arms 71, each of which is pivoted to the casing 57 by means of a pivot 72. One end of each arm 71 has a roller 73 which is in contact with ear 69. Spring 74 interconnects the opposite ends of arms 71, biasing them in a direction forcing the rollers 73 inwardly and downwardly with the ear 69 interposed there-between. To limit downward movement of the rollers 73, an adjustment member 76 may be provided in the casing 57 which engages a pad 77 on the lower edge of the arm 71. In the form shown in the accompanying drawings, the adjustment 76 is manually movable, but it will be understood that the adjustment 76 may be fixed and may be ground to proper height to control the position of rest of rocker arm 71.

In the operation of the device shown in FIGS. 7-9, normal position is shown in FIG. 7. The pin 66 is within the notch 68 and rests on the lugs 63. A horizontal force on pin 66 tends to rotate restraining link 65 about pin 67 but is resisted by ear 69 bearing against one of the rollers 73 which are biased in the position shown in FIG. 7 by spring 74 acting on arms 71. When the force imposed by ear 69 is sufficient to overcome spring 74, one of the arms 71 pivots to lift its roller 73 (see left roller in FIG. 9). As arm 71 starts to pivot, the mechanical advantage of link 65 acting against roller 73 increases so that the completion of lifting is very sudden. The top surface of link 65 is curved at a radius having its center at pin 67 to further facilitate this movement. After ear 69 has lodged under roller 73 (left side of FIG. 9) it acts as a prop to hold the device in position until manually reset. When ear 69 passes beneath roller 73, downward facing notches 68 move to the right or left to allow pin 66 to move beyond the horizontal tops of lugs 63 and down flanks 64 thereby escaping from the device 56 and allowing the insulator string 26a and conductor to drop to the ground without injury to arms 24a.

What is claimed is:

1. A load limiting device comprising a first member having first means for suspending said device from a pole or tower, said first member comprising a casing and a link pivotally mounted on said casing about a first axis and having a support position and a release position, a second member having second means for suspending the upper end of an insulator string from said device, said second member movable relative to said first member with a horizontal component having a magnitude proportional to the horizontal load on a conductor attached to the lower end of said insulator string, third means normally holding said link in support position, said second member being supported from said first member, said second member being articulately connected to said link for relative pivotal movement about a second axis parallel to said first axis and vertically displaced therefrom, increase in magnitude of the horizontal load on said second member biasing said link toward release position to render said third means inoperative and to drop said insulator string from said pole or tower.

2. A load limiting device comprising a first member having first means for suspending said device from a pole or tower, a second member having second means for suspending the upper end of an insulator string from said device, a link pivotally attached to said first member, a latch for latching said link in support position relative to said first member, third means for suspending said second member from said link when said link is in support position and releasing said second member when said link is pivoted out of support position, and cooperating fourth means on said second member and said latch for unlatching said link from support position when the angle between said second member and said first member exceeds a pre-selected amplitude.

3. A device according to claim 2 in which the upper end of said link is formed with a notch, said third means comprising a stud fitting into the bottom of said notch, said latch also fitting into said notch when said link is in support position.

4. A device according to claim 3 in which the pivot for said link, said stud and said latch are in vertical alignment when said link is in support position.

5. A device according to claim 4 in which the upper edge of said second member is formed with a cam surface and said latch with a cam-engaging surface engaging said cam surface when said second member pivots relative to said link through a restricted amplitude, said cam surface having latch lifting surfaces at either end lifting said cam-engaging surface when said preselected amplitude is exceeded.

6. A load limiting device comprising a first member having first means for suspending said device from a pole or tower and having a support for supporting the upper end of an insulator string, said support having a limited length in a horizontal direction, a link pivotted to said first member having an upright position, second means adapted to be attached to an insulator for pivoting said link responsive to horizontal movement of said string, and resilient third means biasing said link toward upright position, said link when in upright position maintaining said second means supported by said support, said second means having two release positions at opposite ends of said support, said link when in either of said release positions being unsupported by said support to permit said second means to move off said support to drop from said support.

7. A device according to claim 6 in which said third means comprises a pair of levers on opposite sides of said link and a spring interconnecting said levers to bias both said levers toward said link, said spring yielding responsive to force of said second means in a horizontal component relative to said link.

8. A device according to claim 6 in which said support comprises a horizontal ledge, said second means comprising a pin sliding on said ledge and supported by said ledge for the length of said limited length and then dropping from said ledge.

9. A device according to claim 6 in which said first member has a downward extension, said support formed on the lower end of said downward extension, said link pivoted to said downward extension and having a notch on its bottom edge, movable in proximity to said support, said second means comprising a pin fitting into said notch and resting on said support when said link is in upright position.

10. A device according to claim 9 in which said link has an upwardly extending ear, said third means comprising a pair of bell cranks pivoted to said first member each having an arm engaging said ear when said link is in upright position, and a spring interconnecting said cranks and biasing said arms toward each other with said ear interposed between said arms.

* * * * *